(12) United States Patent
Engelbrecht et al.

(10) Patent No.: US 8,486,187 B2
(45) Date of Patent: Jul. 16, 2013

(54) MULTIPURPOSE ADDITIVE FOR LOW VOC SOLVENT BASED COATINGS

(75) Inventors: Lothar Alexander Engelbrecht, Heerenveen (NL); Roedolph Van Bohemen, Hoogeveen (NL)

(73) Assignee: BASF SE, Ludwigshafen (DE)

( * ) Notice: Subject to any disclaimer, the term of this patent is extended or adjusted under 35 U.S.C. 154(b) by 644 days.

(21) Appl. No.: 12/087,835

(22) PCT Filed: Jan. 9, 2007
(Under 37 CFR 1.47)

(86) PCT No.: PCT/EP2007/050166
§ 371 (c)(1),
(2), (4) Date: Dec. 18, 2008

(87) PCT Pub. No.: WO2007/082815
PCT Pub. Date: Jul. 26, 2007

(65) Prior Publication Data
US 2010/0004366 A1    Jan. 7, 2010

(30) Foreign Application Priority Data
Jan. 18, 2006  (EP) .................................... 06100517

(51) Int. Cl.
*C09K 8/26* (2006.01)
*C09K 8/502* (2006.01)
*C09D 5/00* (2006.01)

(52) U.S. Cl.
USPC ............... 106/34; 524/53; 524/320; 524/386; 524/801; 524/313; 106/31.26; 106/222; 106/254

(58) Field of Classification Search
USPC ........ 524/320, 35, 53, 386, 801, 313; 106/34, 106/31.26, 222, 254
See application file for complete search history.

(56) References Cited

U.S. PATENT DOCUMENTS

| 4,574,057 A | * | 3/1986 | Kaza et al. ................. 526/238.3 |
| 4,615,739 A | * | 10/1986 | Clark et al. ..................... 106/34 |
| 5,154,967 A | | 10/1992 | Ishii et al. |
| 5,252,615 A | * | 10/1993 | Rao et al. ..................... 521/48.5 |
| 5,332,792 A | | 7/1994 | Jablon |
| 6,130,275 A | | 10/2000 | Gracey et al. |
| 2003/0187103 A1 | * | 10/2003 | Bloom et al. .................. 524/35 |
| 2005/0042379 A1 | | 2/2005 | Oostveen et al. |

FOREIGN PATENT DOCUMENTS

| WO | WO-98/00387 | 1/1998 |
| WO | WO-03060023 A1 | 7/2003 |
| WO | WO 03/064548 | 8/2003 |

OTHER PUBLICATIONS

International Search Report issued May 16, 2007 in PCT/EP2007/050166.
International Prelimina Report on Patentability issued Jul. 22, 2008 in PCT/EP2007/050166.

* cited by examiner

*Primary Examiner* — James J Seidleck
*Assistant Examiner* — Deve E Valdez
(74) *Attorney, Agent, or Firm* — Drinker Biddle & Reath

(57) ABSTRACT

The invention relates to a coating composition comprising at least one binder and a multipurpose additive obtainable by reacting a vegetable oil with a diol or by transesterifying a vegetable oil lower alkyl ester with a diol, both reactions in the presence of a catalyst. The multipurpose additive is used to replace partly the solvent of the coating composition and/or to replace partly the binder thus reducing the VOC content and the viscosity.

8 Claims, No Drawings

MULTIPURPOSE ADDITIVE FOR LOW VOC SOLVENT BASED COATINGS

CROSS REFERENCE TO RELATED APPLICATIONS

This application is the national stage of PCT Application No. PCT/EP2007/050166, filed Jan. 9, 2007, which claims benefit of European Application No. EP06100517.9, filed Jan. 18, 2006.

The present invention relates to solvent based coatings which have a low level of volatile organics compounds (VOC).

The present invention relates to the use of a multipurpose additive based on renewable oils for coatings.

In recent years, considerable efforts have been made by the coatings industry to develop coating formulations containing little or no volatile organic compounds (VOC).

The directory 2004/42/EG of the European Parliament forces the paint industry to reduce the emission of volatile organic compounds (VOC's) in defined paints and varnishes to maximum limits after Jan. 1, 2007 and even sharps these limits after Jan. 1, 2010.

Solvent born systems provide for example higher gloss and a better flow with the possibility of higher pigment/extender loading compared to water born systems. Therefore there is still a need to use solvent born systems and to move to VOC reduced solvent-based compositions which still meet or exceed the performance standards expected from solvent-based compositions such as e.g. good film forming, acceptable viscosity, good drying behaviour, high pigment loading as possible, high gloss, good wetting property, hardness combined with flexibility and no sensitivity for humid conditions.

The formulations of most solvent based coatings, paints and printing inks include a solid resin which is dissolved in a solvent. These compounds often contain other ingredients depending on the intended use and desired characteristics. It is common to add pigments or dyes to obtain colored coatings. It is also known to include additives to determine the characteristics of the coating.

It has been suggested to replace the solvent by co-polymerizing agents which are usually compounds or mixtures of compounds of relatively low viscosity, a relatively high boiling point (i.e. low saturated vapor pressure) which act as solvents during the formulation and processing of the coating. Such co-polymerizing agents can co-polymerize with a resin thereby reducing losses of the solvent to atmosphere on drying of the coating.

WO 9800387 describes the use of a composition comprising a mixture of a fumarate, maleate and 2-allyloxy-succinate esters as a co-polymerizing agent in paint- or coating formulations.

Another approach to avoid high concentrations of VOC's is the use of Latex compositions which typically comprise very low concentrations of VOC's, e.g. less than about 250 g/l and thus are more environmentally compatible. WO2003/060023 is directed to a latex paint composition comprising polyunsaturated fatty acid containing additives derived from vegetable oils such as tung oil.

U.S. Pat. No. 5,154,967 describes in Example 4 the preparation of an alkyd resin. The alkyd resin is dissolved in ethylene glycol monobutyl ether and isopropanol. After neutralization water is added. The aqueous varnish obtained has a non-volatile content of 50%. Not addressed is the problem of how to reduce the VOC content.

U.S. Pat. No. 5,332,792 describes an alkyd resin containing a rheological modifier as additive. The additive is an oxidized ethylene-carbon monoxide copolymer. Not addressed is the problem of how to reduce the VOC content.

Tung oil is a known drying oil showing a good drying behaviour, but the film forming properties are not satisfactory. Tung oil methyl ester shows a bad drying behaviour.

It is still a need to provide a coating preferably based on alkyd binder wherein the drying characteristic and film performance of said coating are excellent or at least on the same level compared to conventional alkyd resins but containing little or no volatile organic compounds (VOC) while having an acceptable viscosity.

It has been found that the addition of multipurpose additives derived from vegetable oils to a coating fulfils the above mentioned requirement.

The term "multipurpose" indicates that the additive may be used to control the VOC content by replacing partly the solvent of the coating composition and/or to replace partly the binder and in addition to control the viscosity. Furthermore, the pigment loading can be increased.

One aspect of the present invention is a coating composition comprising at least one binder and an additive obtainable by reacting a vegetable oil with a diol or by transesterifying a vegetable oil lower alkyl ester with a diol, both reactions in the presence of a catalyst.

Diols are preferably OH—$(CH_2)_n$—OH with n=2 to 10 or unsaturated diols HO—R—OH wherein R is $C_3$-$C_{10}$-alkenylene or $C_3$-$C_{10}$-alkinylene or a divalent residue derived from di- or poly-alkylene glycols Examples of diols OH—$(CH_2)_n$—OH are ethylene glycol; propylene glycol, butane diol etc. Examples for unsaturated diols are 2-butene-1,4-diol and 2-butyne-1,4-diol.

Especially good results are obtained using 2-butene-1,4-diol.

Di alkylene glycols are diethylene glycol, dipropylene glycol, dibutylene glycol. Polyalkylene glycols are polyethylene glycol or polypropylene glycol.

Vegetable oil lower alkyl esters are preferable vegetable oil methyl ester, which are a known raw material for surfactants.

Vegetable oils include triglyceride oils such as soybean oil, linseed oil, sunflower oil, corn oil, perilla oil, oiticica oil, canola oil, rapeseed oil, castor oil, cottonseed oil, palm oil, tung oil and the like. Tung oil is preferred.

As the catalysts for the transesterification, basic catalysts (alkali hydroxides, alcoholates, oxides, carbonates, anion exchangers) or acidic catalysts (mineral acids, p-toluene sulfonic acid, boron trifluoride, cation-exchangers) may be used.

The transesterification temperature is in the range of room temperature up to 220° C.

The vegetable oils are preferably reacted with a diol using basic catalysts such as alkali hydroxides at room temperature.

The vegetable oil methyl esters are preferably transesterified using an acid catalyst such as p-toluene sulfonic acid at a temperature between 160-200° C.

The transesterification reaction is known and results in a mixture of monoester and diester of the used diol and the polyunsaturated fatty acid derived from the used vegetable oil. The mixture can contain by-products such as mono- or di-glycerides.

The mixture is an inviscid clear oil and is used without further purification as multipurpose additive to replace partly the solvent of the coating composition and/or to replace partly the binder thus reducing the VOC content and the viscosity.

Especially preferred is the multipurpose additive based on the transesterification of 2-butene-1,4-diol and the polyunsaturated acid mixture derived from tungoil. This product shows the best drying behaviour and film forming properties.

The binder may be any polymer that is cured by radical polymerization.

The coating compositions of special interest in the present invention are alkyd coating compositions containing conventional air drying or semi drying long oil or medium oil alkyd resin, typically a paint or a clear coating. Included are paints, varnishes, finishes, enamels, stains and similar materials.

Alkyd resins are formed through the incorporation of unsaturated fatty acid esters into polyester or polyurethane chain-extended polymer systems. Curing is obtained via auto-oxidative crosslinking. Conventional alkyd resin systems contain solvents, anti skinning agents and siccatives. The solvents are usually organic solvents.

Longoil alkyd resins are especially known as good dispersing resins for a wide variety of pigments.

The ratio of the inventive additives to the alkyd resin is suitable in the range from 2:98 to 50:50 parts be weight, preferably from 5:95 to 40:60 and more preferably from 10:90 to 30:70 parts by weight.

The solvents used in alkyd resins are aliphatic, cycloaliphatic and aromatic hydrocarbons such as paraffines, mineral spirits known as white spirit, as well as xylene, toluene, alcohol ethers, glycol ethers, ketones, esters, alcohol ether acetates or mixtures thereof.

The coating composition according to the invention may furthermore contain various additives such as UV stabilizers, cosolvents, dispersants, anti skinning agents, siccatives, levelling agents, synergists, surfactants, inhibitors, fillers, anti-static agents, flame-retardant agents, lubricants, antifoaming agents, extenders, plasticizers, anti-oxidants, anti-freezing agents, waxes, thickeners, thixotropic agents, etc.

The composition may be used as a clear varnish or may contain pigments. Examples of pigments suitable for use are metal oxides, such as titanium dioxide or iron oxide, or other inorganic or organic pigments.

The coating composition according to the invention can be prepared by mixing the multipurpose additive with at least one binder, preferably a conventional air-drying or semi-drying long oil or medium-oil alkyd resin and optionally further additives in a manner known in the art.

The pigment is added usually as pigment concentrate which may also contain the inventive additives.

The pigment may be inorganic or organic, transparent or non-transparent. Non-limiting examples of such pigments are titanium dioxide, iron oxides, carbon black, mixed metal oxides, mono-azo and di-azo pigments, copper phthalocyanines and anthraquinones. Suitable extenders are, for instance, calcium carbonate, barium sulphate, kaolin, talc, diatomaceous earth, mica and zinc oxide.

The invention also relates to coating compositions having VOC's content below 250 g/l.

Another aspect of the present invention is to provide a multipurpose additive as defined above that may be used as a co-polymerizing component in coatings, especially in paints or varnishes.

The inventive additives may further be used in pigment concentrates.

Experimental Part:

General Procedure A for Multipurpose Additives:

1 mole of caustic potash is dissolved in 11.84 mole of methanol. 7,21 mole of a glycol [see Table 1] and 4,8 mole of a vegetable oil are added. The mixture is vigorously stirred at ambient or slightly increased temperature for about 2 hours under nitrogen atmosphere. After a resting time of about 1 day the lower phase is discarded as chemical waste. The upper phase mainly consisting of the glycol esters of the corresponding fatty acids can be used in the succeeding experiments without additional purification.

General Procedure B for Multipurpose Additives:

A 2:1-mixture of the corresponding fatty acid methyl ester of a vegetable oil, a glycol [see table 1] and 0.5 weight-% of p-toluene sulfonic acid are placed in a three-necked flask under nitrogen atmosphere and heated to 180-190° C. for about 5 h. The resulting products can be used in the succeeding experiments without additional purification.

TABLE 1

Synthesized Multipurpose Additives

| Example | Vegetable oil | Glycol | Procedure |
|---|---|---|---|
| 1 | Tung oil | 2-butene-1,4-diol | A |
| 2 | Tung oil | 2-butene-1,4-diol | B |
| 3 | Tung oil | Ethylene glycol | B |
| 4 | Tung oil | Poly ethylene glycol 600 | B |
| 5 | Tung oil | Poly ethylene glycol 300 | B |
| 6 | Tung oil | Poly ethylene glycol 200 | A |
| 7 | Tung oil | Propylene glycol | A |
| 8 | Tung oil | N-Methyl diethanolamine | A |
| 9 | Sunflower oil | 2-butene-1,4-diol | A |
| 10 | Linseed oil | 2-butene-1,4-diol | A |
| 11 | Castor oil | 2-butene-1,4-diol | A |
| 12 | Rape oil | 2-butene-1,4-diol | A |
| 13 | Corn oil | 2-butene-1,4-diol | A |
| 14 | Tung oil | butane-1,4-diol | A |
| 15 | Tung oil | 2-butyne-1,4-diol | A |

Application Part:

TABLE 2

Preparation and Properties of Pigment Concentrates using inventive additives:

| | Comparative Example I (Resin Free Pigment Concentrate) | Comparative Example II (Resin Cont. Pigment concentrate) | Inventive Example (Resin Free Pigment Concentrate) |
|---|---|---|---|
| Isoparaffine | 26.0 | 21.0 | 16.5 |
| EFKA-1500 [Dispersing resin (90% solid)] | — | 30.0 | — |
| Example 1 [100% solid] | — | — | 25.0 |
| EFKA-4330 [Dispersant (70% solid)] | 36.0 | 11.0 | 16.5 |
| EFKA-7645 [Synergist (100% solid)] | 2.0 | 2.0 | 2.0 |
| Phthalo Blue 15:3 Irgalite Blue PG | 36.0 | 36.0 | 40 |
| | 100 | 100 | 100 |

TABLE 2-continued

Preparation and Properties of Pigment Concentrates using inventive additives:

|  | Comparative Example I (Resin Free Pigment Concentrate) | Comparative Example II (Resin Cont. Pigment concentrate) | Inventive Example (Resin Free Pigment Concentrate) |
|---|---|---|---|
| Ground with glass-beads 1:2 for 4 hours with a shaker |  |  |  |
| Spec. Gravity | 1.069 | 1.096 | 1.084 |
| Pigment loading % | 36.0 [+] | 36.0 [+] | 40.0 [++] |
| Viscosity: Cone & Plate 23° C./750 rpm | 2.13 [+] | 7.50 [−] | 1.20 [++] |
| Solvent content [g/l of concentrate] | 393 [−] | 299 [+] | 233 [++] |
| Mixed out in H.S.L.O. Alkyd Transparent (15 pigment in 100 solid resin b.w.) | good | good | good |
| Colour-strength in H.S.L.O. Alkyd White (TiO2:pigment = 26:1 b.w.) | 100% | 96.5% [−] | 100% |

[Note:
VOC content must be <300 grams/liter]
[+] acceptable
[++] very acceptable
[−] unacceptable Table 2 explains the advantage of using the inventive additive.

Comparative Examples I and II show pigment concentrates with and without dispersing resins.

Example I is a Resin Free Pigment Concentrate (RFPC) with 393 g/l VOC.

Adding about 25% by weight to a transparent long oil alkyd resin, the resulting coating will have a VOC-content higher than allowed.

When a dispersing resin is used in the concentrate (see table 2 Example II), the processing viscosity is much too high (7.5 Poise).

Adding the inventive additive nearly 10% of the solvent can be replaced (16.5% of isoparaffine instead of 26%) and the VOC content can be decreased to 233 g/l. Furthermore the pigment loading can be increased (40% instead of 36%), the viscosity is lowered (1.2 Poise instead of 2.13 Poise at 23° C.)

Furthermore the content of the dispersant (EFKA 4330) could be lowered from 26% to 16.5%

TABLE 3

"Multipurpose Additives" in High solid L.O. Alkyd Transparent and white:

| Paint formulation | with high viscosity and low VOC | with lower viscosity and higher VOC | with "Multipurpose Additive" |
|---|---|---|---|
| Multipurpose Additive (100% solid) Ex. 1 | — | — | 7.30 |
| Long oil Alkyd resin (100% solid) | 46.19 | 46.19 | 38.89 |
| Long oil Alkyd resin (70% solid) | 35.59 | 35.59 | 35.59 |
| Thix resin (93% solid) | 1.98 | 1.98 | 1.98 |
| Ba dryer 12.5% | 4.67 | 4.67 | 4.67 |
| Co dryer 10% | 0.61 | 0.61 | 0.61 |
| Zr dryer 18% | 4.79 | 4.79 | 4.79 |
| Anti skinning agent | 0.40 | 0.40 | 0.40 |
| UV absorber | 0.72 | 0.72 | 0.72 |
| Levelling additive | 0.43 | 0.43 | 0.43 |
| Di Basic Ester solvent | 4.62 | 4.62 | 4.62 |
| High Solid Transparent | 100.00 | 100.00 | 100.00 |
| Spec. Gravity | 0.993 | 0.993 | 0.985 |
| Solid % b.w. | 75.59 | 75.59 | 75.59 |
| Gr. Solvent/Ltr. | 243 [+] | 243 [+] | 240 [+] |
| Visc. C&P 23° C. 750 RPM (100 cone) | 30 Poise [−] | 30 Poise [−] | 11 Poise [+] |
| RFPC White (see table 4) | 62.56 | 62.56 | 62.56 |
| Isoparafine | — | 6.50 | — |
| High Solid White (60 TiO2 on 100 solid resin) | 162.56 | 169.06 | 162.56 |
| Spec. Gravity | 1.240 | 1.210 | 1.232 |
| Solid % b.w. | 80.23 | 77.20 | 80.23 |
| Gr. Solvent/Ltr. | 245 [+] | 276 [−] | 244 [+] |
| Visc. C&P 23° C. 750 RPM (100 cone) | 31 Poise [−] | 14 Poise [+] | 14 Poise [+] |

Note:
VOC content must be <250 grams/liter for High Solid
[+] acceptable
[−] unacceptable

TABLE 4

Resin Free Pigment Concentrate (RFPC) White formulation:

|  | form. | s.g. | volume | solid |
|---|---|---|---|---|
| Isoparafine | 9.0 | 0.75 | 12.00 | — |
| Dispersant (80% solid) E-4300 | 16.0 | 1.00 | 16.00 | 12.8 |
| Wetting agent (100%) E-6220 | 2.5 | 1.00 | 2.5 | 2.5 |
| Titanium-dioxide white | 72.5 | 4.0 | 18.12 | 72.5 |
|  | 100.0 |  | 48.62 | 87.8 |
| Spec. Gravity |  | 2.057 |  |  |
| gram solvent in 1 liter concentrate |  | 251 +) |  |  |

Table 3 shows three different paint formulations using the same alkyd formulation. 62.56 g of the pigment concentrate white shown in Table 4 have been added.

Formulation 1 ends up in a higher viscous (31 Poise) paint having a VOC content of 245 g/l Formulation 2 ends up in a less viscous (14 Poise) paint because isoparaffine was added in addition to the paint, thus having a VOC content of 276 g/l Formulation 3 contains the inventive additive. 7.3% (38.89% instead of 46.19%), this is 10% of the solid resin what is replaced. Thus the viscosity is lowered from 31 to 14 poise.

The invention claimed is:

1. A coating composition comprising an air drying or semi drying long oil or medium oil alkyd resin and at least one multipurpose additive, said additive being obtained by reacting a vegetable oil with 2-butene-1,4-diol in the presence of a catalyst or said additive being obtained by transesterifying a vegetable oil lower alkyl ester with 2-butene-1,4-diol in the presence of a catalyst; wherein said multipurpose additive replaces a portion of solvent, binder, or both in the coating composition to reduce the VOC content and the viscosity of the coating composition.

2. The coating composition according to claim 1, wherein the ratio of the multipurpose additive to the alkyd resin is in the range from 2:98 to 50:50 parts by weight.

3. The coating composition according to claim 1, wherein the vegetable oil is tung oil.

4. The coating composition according to claim 1 having a VOC content below 250 g/l.

5. A method for reducing the VOC content and the viscosity of a coating composition comprising replacing a portion of solvent, binder, or both in a coating composition with a multipurpose additive, said additive being obtained by reacting a vegetable oil with 2-butene-1,4-diol in the presence of a catalyst or said additive being obtained by transesterifying a vegetable oil lower alkyl ester with 2-butene-1,4-diol in the presence of a catalyst.

6. A paint or varnish or pigment concentrate comprising a multipurpose additive, said additive being obtained by reacting a vegetable oil with 2-butene-1,4-diol in the presence of a catalyst or said additive being obtained by transesterifying a vegetable oil lower alkyl ester with 2-butene-1,4-diol in the presence of a catalyst.

7. The coating composition according to claim 2 having a VOC content below 250 g/l.

8. The coating composition according to claim 1, wherein said additive is obtained by reacting reactants consisting essentially of a vegetable oil and 2-butene-1,4-diol in the presence of a catalyst or is obtained by reacting reactants consisting essentially of a vegetable oil lower alkyl ester and 2-butene-1,4-diol in the presence of a catalyst.

* * * * *